Oct. 28, 1930.  N. FLORINE  1,780,123
PROJECTING APPARATUS FOR CINEMATOGRAPHY
Filed Jan. 16, 1926
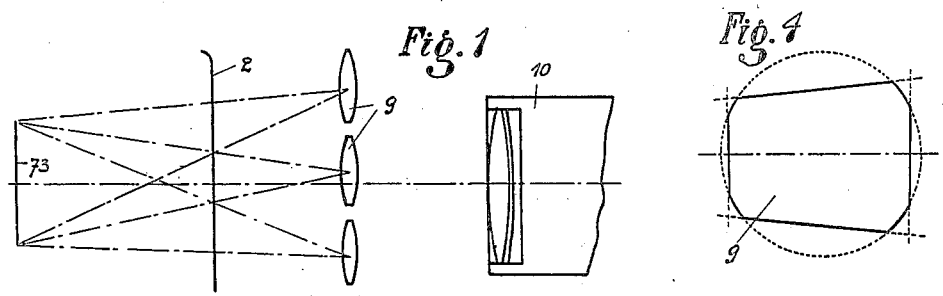
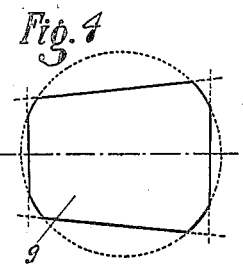
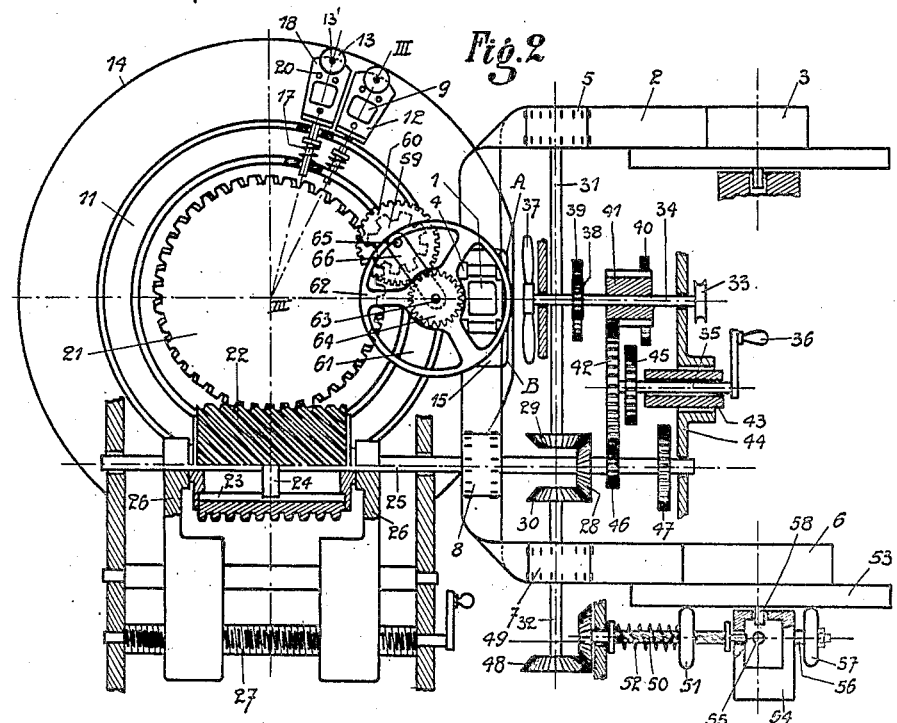
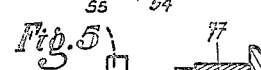
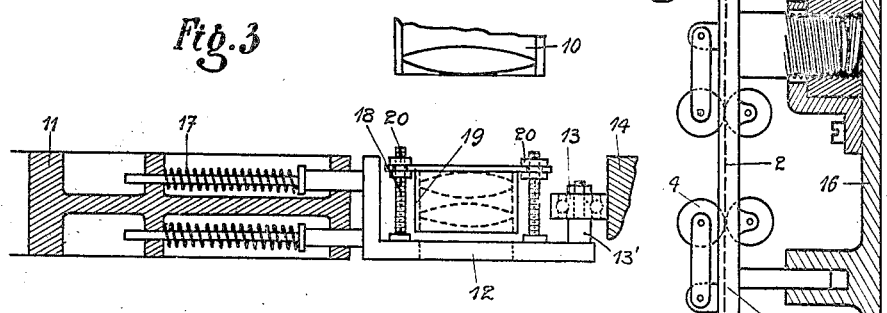
Inventor
N. Florine
by Langner, Parry, Card & Langner
Att'ys.

Patented Oct. 28, 1930

1,780,123

UNITED STATES PATENT OFFICE

NICOLAS FLORINE, OF BRUSSELS, BELGIUM

PROJECTING APPARATUS FOR CINEMATOGRAPHY

Application filed January 16, 1926, Serial No. 81,713, and in Belgium January 19, 1925.

The present invention relates to a projecting apparatus for cinematography, comprising a fixed objective and a projecting aperture in front of which a film is moved continuously.

The invention has for its object to provide an apparatus of the kind specified wherein the optical compensation is obtained by a plurality of rectification lenses displaced according to a rectilinear and uniform movement between the projecting aperture and the objective, said lenses being mounted on a disk driven by the main-shaft of the prime-mover which effects the displacement of the film.

Another object of the invention is to provide an apparatus for performing coloured projections by means of a differently coloured screen, rotated in front of the projecting aperture by means of the main shaft.

The disk on which the lenses are mounted may be around an axis parallel to the direction of projection, each lens being engaged in a frame or bearing mounted to slide relative to the said disk in a radial direction and pressed towards the periphery of the said disk by springs, said frame or bearing being guided along a determined path of travel, by means of a roller contacting with a track having substantially the same shape as the disk but presenting a practically rectilinear part, near the projecting aperture.

Many other objects and features will appear and be explained in reference to the accompanying drawings showing by way of example an embodiment of the invention.

In the accompanying drawings:

Figure 1 is a diagram showing the principle of the invention.

Figure 2 is an elevation of the apparatus, partly, in section, looking towards the projection aperture.

Figure 3 is a sectional view, on larger scale, on the line III—III of Figure 2.

Figure 4 is a view, on larger scale, of a lens, and

Figure 5 shows a side view of the frame of the projecting aperture, some portions of the frame being omitted.

The projecting apparatus for continuous motion cinematography comprises a projecting aperture 1 in front of which the film 2 is moved continuously. said film being guided by rolls 4. The film which is unwound from the feeding spool 3 passes over a guide roller 5 and a driving roller 8, and is rewound on the spool 6 after passing over the guide roller 7. The optical rectification is obtained by interposing a number of movable lenses 9 between the film 2 and the usual fixed objective 10. The distance between the lenses 9 and the film 2 and the speed of movement of the lenses are regulated in order to obtain a fixed virtual image 73, which is received by the objective 10 and projected on the screen.

If for example, the lenses have a focal distance of 90 mm. and the distance between the lenses and the film is 90 mm. × 3/5 = 54 mm., the speed of movement of the lenses will be arranged to be substantially equal to 5/3 of the speed of the film. In such a case the virtual image will be disposed 81 mm. behind the film and will be enlarged 5/2 times, whilst the objective has a focal distance 2½ times larger than that of an ordinary projector, the projection taking place on a screen of a given area and disposed at the same distance.

The lenses 9 are moved between the film and the objective according to a rectilinear and uniform motion and to this end a great number of lenses for instance thirty six, are mounted on a disc 11 rotating about an axis parallel to the optical axis. Each of the lenses may be moved radially on the disc and for this purpose the lenses are fitted in frames or bearings 12 capable of sliding freely on the disc. The frames or bearings 12 are each provided with a friction roller 13 constantly held in contact with a track 14, having a substantially circular shape and which is concentric to the disc, by springs 17.

In order to reduce friction, the roller 13 is mounted on its shaft in ball-bearing. The shape of the track is such that when passing the projection aperture the centre of each lens describes a trajectory which is substantially rectilinear. In the example shown the path A B is an arc of a circle having a radius of 1218 mm., the centre of said arc being disposed along a line passing through the centre of the disc. In this manner the movement of lenses along this portion is substantially rectilinear and in order to render it practically uniform, a relatively large number of lenses may be used. For example thirty-six lenses may be used. Only two of these lenses are shown so as not to render the drawing obscure. In order that the images of the different photographs of the film will all be projected by the lenses to the same point it is necessary for the distance between the lenses to be equal to $\frac{5}{3}$ times the distance between the centres of the photographs of the film since these lenses are placed at a distance from the image of the photograph of the film which is included by the objective equal to $\frac{5}{3}$ times the distance from the image to the photograph of the film. In the case of a normal film where the different photographs of the film are 19 mm. in height the distance between the lenses should be 19 mm.$\times \frac{5}{3} = 31.6$ mm. In order to compensate for the differences resulting of the shrinkage of the film, the apparatus, shown on a larger scale at Fig. 5, may be used. The film is guided between the rollers 4 disposed laterally of the projecting aperture 1. The rollers are supported by a frame 15 which may be moved relatively to the support 16, by rotating the internally threaded bush 77 rotatably mounted on the support 16 and is screwed on a threaded rod connected to the frame 15. In this manner it is possible to vary the distance between the film and the lenses, which move in a fixed plane, so that the film may be adjusted relatively to the position of the lenses according to the degree of shrinkage of the film to be projected.

The lenses may have a trapezoidal shape so that the greater part of the pencil of rays of light may be used, the height of the lenses being limited by the available space for mounting the lenses (31.6 mm. in the example illustrated). The lenses which are all mounted at the same focal distance, with an allowance of 0.1 mm. according to the allowance of 1/30 of the image, are initially adjusted in a frame 19 mounted on three threaded rods 18 secured to the disc 11. The frame is held in position on the rods 18 by nuts 20 and by this arrangement is adjustable at three points. The holes in the frame are of larger diameter than the rods, thus allowing a lateral movement of said frame. After the frame has been adjusted in the correct position the lenses are maintained in position by friction.

The general arrangement of the projecting apparatus is shown in Fig. 2. A wheel 21 with helicoidal teeth is secured to the disc 11 and is driven by the prime mover through the medium of the helicoidal threaded wheel 22. The internal periphery of the wheel 22 is provided with longitudinal grooves 23 with which engage projections 24 mounted on the driving shaft 25. The wheel 22 is prevented from longitudinal movement by brackets 26 which may be moved axially relatively to the shaft 25 by means of a screw spindle 27. By rotating the spindle 27 the wheel 22 is moved laterally and the tooth wheel 21 is moved angularly through a corresponding distance thereby turning the disc 11 with the lenses in order that the latter during operation may coincide in turn with the projecting aperture.

On the shaft 25 is keyed the driving roller 8 for the film, and a bevel pinion 28 gearing with the bevel wheels 29 and 30 mounted respectively on the shafts 31 and 32 of the guiding rollers 5 and 7.

The apparatus is driven by means of a prime mover, for example an electric motor, which, by means of a belt drives a pulley 33 mounted at the end of a shaft 34. At the other end of the shaft 34 is keyed a fan 37 for cooling the film.

The shaft 34 is connected to the shaft 35 of the handle 36, by means of speed reduction gear consisting of a pinion 38, keyed to the shaft 34, a toothed wheel 39 mounted on an intermediate shaft and gearing with the pinion 38, a pinion 40 mounted on the intermediate shaft and gearing with a toothed wheel 41 freely supported by the shaft 34, said wheel 41 gearing with the pinion 42 mounted on the shaft 35.

In order to allow the rotation of the shaft 25 ensuring the motion of the film by the driving roller 8 and the turning of the disc by means of the wheels 22 and 21, of the shaft 34, a variable speed gearing is interposed between the shafts 25 and 34, as illustrated by way of example in Fig. 2. As shown, the shaft 35 is keyed in a bush 43 slidably mounted in a bearing 44. Said shaft bears the two pinions 42 and 45 of different diameter, and one or the other of said pinions may mesh with a pinion 46 or 47 keyed on the shaft 25 according to the position of the shaft 35 relatively to its bearing 44. The toothed wheel 41 has a sufficient length to ensure its continuous meshing with the pinion 42 whatever may be the position of the shaft. For an intermediary position of the pinions 42 and 45 between the pinions 46 and 47 it is possible to actuate the fan by means of the prime mover or the handle while the film and the disc remain motionless.

The winding up of the film on the drums 6 is effected in any suitable manner. In a suitable device for this purpose, the film is wound on the drum 6 by means of a mechanism comprising a shaft 50 carrying a bevel pinion 49 gearing with a bevel wheel 48 keyed on the shaft 32 of the guide roller 7. The shaft 50 has a thread of steep pitch with which engages a friction roller 51. A spring 52 constantly urges said roller towards the centre of a friction plate 53 secured to the drum 6. The free end 58 of the shaft 50 engages with a bearing 54 in which are also mounted shafts 55 and 56 carrying rollers 57 (only one of which is shown) bearing against the friction disc 53. The shaft 58 serves to take up axial thrusts.

In order to obtain coloured projections, a trichrome projection takes place through coloured screens (red, green, blue,) which appear alternately before the projecting window. The screens 61 are provided in a rotary disc 62 mounted on a shaft 63 whereon is keyed a pinion 64. Said pinion 64 meshes with a toothed wheel 60 mounted on a shaft 65 supporting a wheel 59 with helicoidal teeth driven by the wheel 21. The pivot 63 is mounted upon an arm 66 which is pivoted for movement about the pivot 65. In this manner, the disk 62 may be brought, when it is not desired to produce the projection in colors, outside of the pencil of light rays of projection.

What I claim as my invention and desire to secure by Letters Patent is:

1. A cinematograph projecting apparatus of the type adapted to move a film continuously comprising means for displacing the film in a rectilinear direction in front of a projecting aperture, a rotary disc pivoted around an axis parallel to the direction of projection and supporting a great number of rectification lenses placed in bearings slidably mounted in radial grooves provided in the rotary disc, a substantially circular track concentric to the disc and presenting near the projecting aperture a practically rectilinear part, springs in these grooves holding each lens bearing in contact with the track, and a friction roller between each bearing and the track.

2. A cinematograph projecting apparatus of the type adapted to move a film continuously comprising means for displacing the film in a rectilinear direction in front of a projecting aperture, a rotary disc pivoted around an axis parallel to the direction of projection and supporting a great number of rectification lenses placed in bearings slidably mounted in radial grooves provided in the rotary disc, a substantially circular track concentric to the disc and presenting near the projecting aperture a part constituted by an arc of a circle having a radius considerably larger than that of the rotary disc, the center of said circle being on a line passing through the center of said disc, springs in these grooves holding each lens bearing in contact with the track, and a friction roller between each bearing and the track.

3. A cinematograph projecting apparatus of the type adapted to move a film continuously comprising means for displacing the film in a rectilinear direction in front of a projecting aperture, a rotary disc pivoted around an axis parallel to the direction of projection and supporting a great number of rectifying lenses placed in a bearing, means between the motor shaft of the rotary disc and the shaft itself of this disc or permitting an angular displacement of the rotary disc without angular displacement of the motor shaft, these last means comprising an helicoidal threaded wheel meshing with a wheel secured to the shaft of the rotary disc supporting the lenses, said helicoidal wheel being rotated by the main shaft by the interposition of a shaft provided with projections in longitudinal grooves of the helicoidal wheel and being capable of longitudinal displacement.

In testimony whereof I have signed my name to this specification.

NICOLAS FLORINE.